United States Patent

Ririe, Jr.

[11] 3,897,211
[45] July 29, 1975

[54] SAMPLE CONDITIONER
[75] Inventor: Otis E. Ririe, Jr., Bartlesville, Okla.
[73] Assignee: Phillips Petroleum Company, Bartlesville, Okla.
[22] Filed: Aug. 6, 1973
[21] Appl. No.: 385,883

[52] U.S. Cl................... 23/254 R; 23/255 R; 73/23
[51] Int. Cl......................... G01n 1/22; G01n 31/00
[58] Field of Search.......... 23/232 R, 254 R, 255 R, 23/259, 253 PC; 73/23, 23.1, 421.5 R

[56] References Cited
UNITED STATES PATENTS
| | | | |
|---|---|---|---|
| 3,062,625 | 11/1962 | Chandler | 23/256 |
| 3,300,282 | 1/1967 | Risk et al. | 23/232 R |
| 3,512,393 | 5/1970 | Weiss | 73/23 |
| 3,756,781 | 9/1973 | Kimbell | 23/253 PC X |

OTHER PUBLICATIONS
Mine Safety Appliances Co., Bulletin 0705-4 (1965).

Primary Examiner—Morris O. Wolk
Assistant Examiner—Timothy W. Hagan
Attorney, Agent, or Firm—Neuman, Williams, Anderson & Olson

[57] ABSTRACT

A system for conditioning a gaseous sample for analysis in which the sample is handled in a manner which precludes reaction of reactive components therein. Means are provided for sending a predetermined amount of a gaseous sample through an analyzer while permitting the remainder of the gaseous sample to by-pass the analyzer. The system has means for purging essentially all components thereof so as to minimize system contamination and maximize accuracy of analysis.

6 Claims, 1 Drawing Figure

PATENTED JUL 29 1975
3,897,211
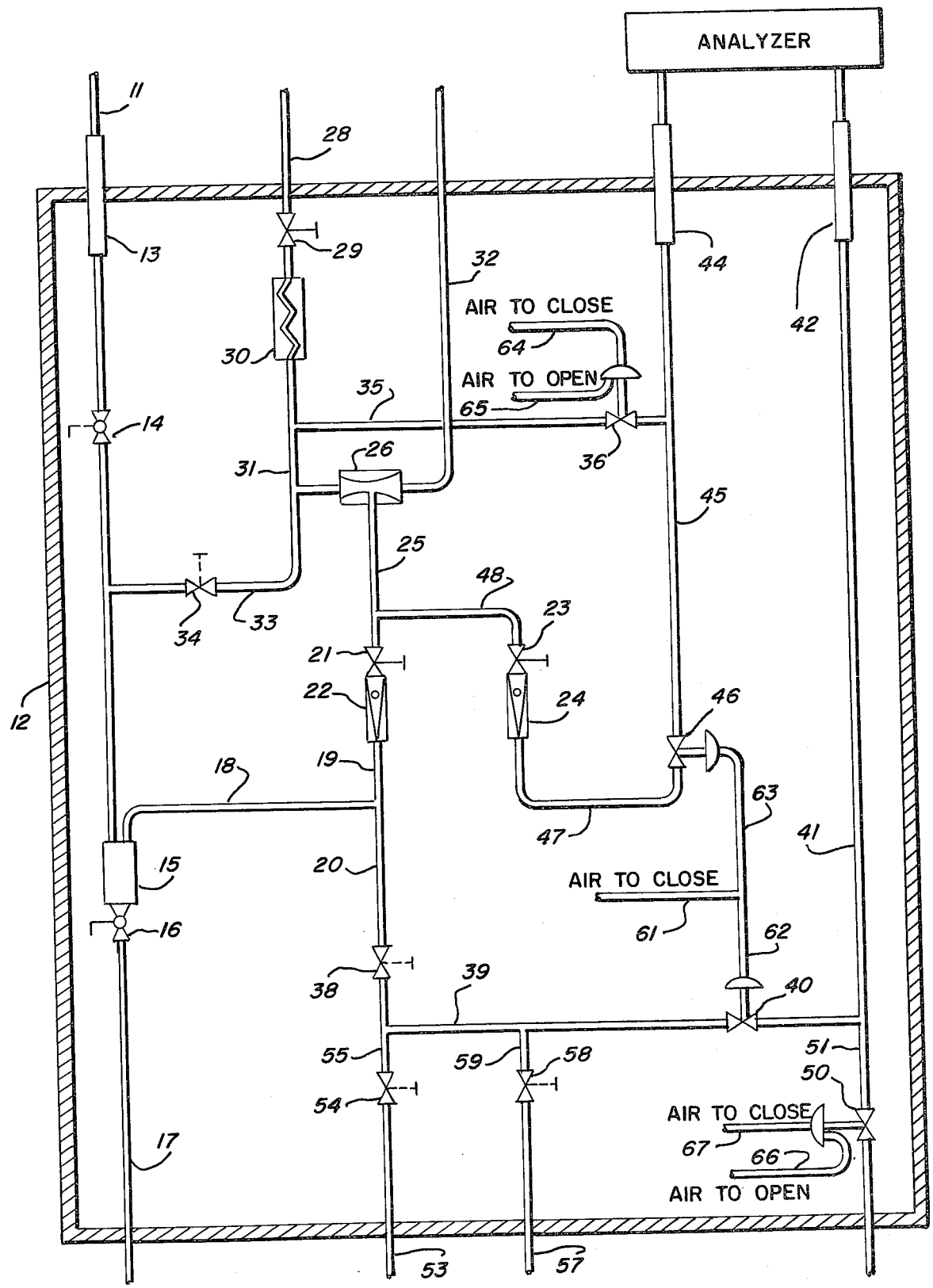

SAMPLE CONDITIONER

This invention relates to a system for conditioning a gaseous sample which is to be analyzed to determine the amount of one or more gases therein.

The recovery of sulfur from gaseous streams containing hydrogen sulfide is a fairly common operation, as for example in the gas and petroleum industries. Such an operation results in both the recovery of sulfur and a reduction in atmospheric pollution. Sulfur is commonly produced by processes such as the Claus process, which involves the reaction of hydrogen sulfide and sulfur dioxide. Optimum operation of a typical sulfur recovery unit involves maintaining a specific ratio of sulfur dioxide to hydrogen sulfide in the reactor. This same ratio is thought to exist throughout the system and can be determined by analysis of residual or tail gases from the operation. Sampling of the tail gases is complicated by the presence of elemental sulfur and sulfur compounds therein which, as far as the analysis of reactants is concerned, are contaminants. Also, the two reactive gases, hydrogen sulfide and sulfur dioxide, react in the presence of liquid water which may condense in tail gases and this further complicates obtaining an accurate analysis. Also, sulfur vapors and sulfur aerosols in a sample can condense and deposit along the interior of sample handling equipment causing additional analysis problems.

It is a principal object of this invention to provide a system for conditioning a sample of a gaseous stream whereby an accurate analysis of the sample can be obtained.

It is a further object to provide a system for conditioning a sample of a gaseous stream containing hydrogen sulfide and sulfur dioxide in which system reaction between these two reactive materials is prevented throughout the sampling and analysis.

It is a still further object of this invention to provide a system for conditioning a gaseous stream containing, among others, the reactive components hydrogen sulfide and sulfur dioxide which will operate with minimum attention for extended periods.

In accordance with a presently preferred embodiment of the present invention, apparatus is provided for conditioning a sample of a gaseous stream containing, for example, vaporized sulfur, hydrogen sulfide, sulfur dioxide, water and possibly other components, which conditioning apparatus permits an accurate and repeatable analysis of the amount of hydrogen sulfide and sulfur dioxide in the gaseous stream.

The advantages and features of the invention should become apparent from the following detailed description taken in conjunction with the accompanying drawing which is a schemmatic drawing of the sample conditioning system of this invention.

Referring now to the drawing in detail, the conditioning apparatus of this invention is described with respect to use for conditioning a gaseous sample such as a tail gas containing water vapor, vaporized sulfur, hydrogen sulfide and sulfur dioxide. Thus, a gaseous sample which can be obtained be a conventional sample withdrawal probe passes through line 11 which is a steam jacketed line whereby the temperature of the sample is maintained in the range of about 300° to 400° F. The sample is introduced into a heated cabinet 12 through a steam jacketed feed-through 13. Cabinet 12 can be a metal cabinet formed preferably of stainless steel and having insulating material on the inner surface. Heating of the cabinet is accomplished by injecting heated fluids such as steam, hot oil, etc. using conventional finned tube heaters (not shown) contained within the cabinet. The dimensions of heated cabinet 12 can vary, but typically the cabinet will have dimensions of 30 inches × 28 inches × 12 inches. Sample flow through line 11 is controlled by block valve 14 which is normally open but which can be closed to isolate the sample conditioner from the sampling system, if desired. The sample continues to flow through line 11 into a liquid-vapor separator 15 which can be of any type, such as the flow reversal or centrifugal type. Condensed liquid, principally sulfur, is removed from the bottom of separator 15 through block valve 16 which is normally closed but which is periodically opened to remove condensed liquid material which leaves the conditioner via exit line 17, which is heated to a temperature sufficient to maintain the sulfur in the liquid state such as, for example, 350° F. From liquid-vapor separator 15 the vapors pass through line 18 which communicates with lines 19 and 20. A majority of the vapor flows through by-pass line 19 controlled by valve 21 with the flow rate being indicated by rotameter 22. Vapors flowing through by-pass line 19 are not subjected to analysis and the purpose of this by-pass feature is to minimize transport time of sample up to and in the conditioner. Typically 80–90% of vapors flowing through line 18 are sent through by-pass line 19 and exhausted from the system, as will now be explained. A sub-atmospheric pressure exists in line 25 due to air flow through aspirator 26 which is preferably a Venturi type vacuum source such as, for example, a vacuum transducer available from Air-Vac Engineering Co., Inc., Milford, Connecticut.

Air under pressure enters heated conditioner cabinet 12 through line 28, its flow being controlled by flow control valve 29, is heated to temperatures on the order of 300° F. by heater 30 and passes into line 31 and then into the aspirator 26. Passage of this heated air through the Venturi in the aspirator creates a low pressure in line 25 and vapors in that line possibly containing sulfur vapors enter the aspirator 26 and are mixed as they flow into the Venturi with the incoming heated air from line 31. From aspirator 26 the gaseous mixture exhausts through line 32 and passes out of the conditioner and can be returned to the basic sulfur recovery process from which the sample was originally obtained. The purpose of heating the air in line 31 is to prevent condensation of the sulfur and water vapors in the exhaust line 32. Air from heater 30 can be directed through line 33 by opening block valve 34 and then into the incoming sample line 11 if it is desired to do so for any reason, such as maintenance or repairs. Heated air from heater 30 is also passed through line 35 and through valve 36 when open for purging of the system as will be explained later.

For analysis, a minor portion of vapors flowing through line 18 are passed through sample conveying line 20, through normally open block valve 38, through line 39, through valve 40 which is normally open, and finally into line 41. The vapors pass through line 41 which projects from cabinet 12 by way of steam jacketed feed-through 42 and into an analyzer which is a suitable gas analyzer such as a gas chromatograph. Sample vapors from the analyzer are returned to cabinet 12 through line 45 by way of steam heated feed-through 44. The vapors pass through normally open valve 46 into line 47 and then through rotameter 24 and flow control valve 23, passing finally into line 48. Vapor flow in line 48 is controlled by flow control valve 23. It will be appreciated that the ratio of vapor flow through lines 19 and 20 is controlled at a desired value by relative adjustment of valves 21 and 23. If greater flow is desired through by-pass line 19, valve 21 is opened to greater degree while valve 23 is throttled, with the reverse being true if greater flow through line 20 is desired.

During each 2 or 3 minute analyzer cycle period flow in line 41 is stopped by closing valve 40 and 46. At this time, air operated valve 50 is opened, which places vent line 51 in communication with the atmosphere so that the pressure in line 41 equalizes with atmospheric pressure.

After the sample of vapors from line 41 is injected into the analyzer at atmospheric pressure by the analyzer sampling value, air operated valve 36 is opened permitting hot pressurized air from line 35 to flow into line 45. Flow of this purging air then proceeds in a direction counter to the sample vapor flow; thus this air flows through line 45, through the analyzer and through line 41 and eventually exhausts to the atmosphere by way of line 51 and valve 50. Air operated valve 50 is then closed and air operated valves 40 and 46 are opened. Flow of purge air then proceeds through line 39, valve 38 and into line 20. The purge air then flows through line 19, rotameter 22, line 25 and finally into aspirator 26, from which it is exhausted through line 32. Purge air also flows through line 18 into liquid-vapor separator 15, sample line 11, block valve 14 and exhausts through line 11 at the point at which the sample was taken originally. Hot purge air also passes through line 45, valve 46 into line 47, through rotameter 24, and flow control valve 23 through line 48 and finally into line 25 where it mixes with purge air flow previously described.

Purge air continues to flow as described until a predetermined time before the gas analyzer sample is to be taken. At that time, air operated valve 36 closes and sample vapors again flow from the process sample point through line 11 as previously described.

For calibration purposes, known gas samples can be introduced into the analyzer. For this operation, sample vapor flow through line 20 is blocked at valve 38 and a calibrating gas can be introduced from an external source via line 53 through flow control valve 54 into line 55 and line 39 and can be sent to the analyzer as previously through line 41. Likewise, at another time another known gas can be introduced from a second external source via line 57 through flow control valve 58 and line 59 into line 39 and through line 41 to the analyzer. Two separate sources of calibrating gases are used since experience has shown that it is not practical to store a mixture of hydrogen sulfide and sulfur dioxide under pressure in the same container for an extended period of time.

Valves 40 and 46 are operated by air pressure. Air pressure is applied via lines 61, 62 and 63. Air pressure in line 61 is controlled from a remotely located electric solenoid valve which can be associated with the analyzer. Similarly, valve 36 is operated by air pressure in lines 64 and 65. Air pressure in lines 64 and 65 is controlled individually by remotely located solenoid valves. Valve 50 is operated by air pressure in lines 66 and 67. Air pressure in lines 66 and 67 is controlled by individual remotely located solenoid valves. In the drawing certain of the valve handles are represented by dotted lines, indicating that these handles preferably extend to the exterior of cabinet 12. If desired, all valve handles could be likewise extended.

The present invention has been described with reference to a gaseous sample stream containing reactive hydrogen sulfide and sulfur dioxide. The conditioner of the invention can be similarly employed with advantage for conditioning gaseous samples when it is desired to maintain, for one reason or another, a sample to be analyzed at a high temperature and in applications where it is desired to prevent gaseous samples from remaining in the conditioner and analyzer for extended periods.

Various advantages of the conditioner of the invention are apparent from the foregoing. Thus, it will be appreciated that with use of the conditioner, condensation of gaseous materials can be avoided and the conditioner can operate for extended periods. Gaseous samples can be taken for analysis from remote points because of the by-pass arrangement of the conditioner which provides rapid circulation of sample through the conditioner with a considerable driving force. No electrical energy is present within the conditioner thereby eliminating hazards associated with explosive atmospheres. The pressure of this gaseous sample is brought into equilibrium with atmospheric pressure within the sample conditioner before being injected into the analyzer. A gaseous sample, which is both poisonous and/or noxious to humans, can be purged with air back into the process from which it came without escaping to the surrounding atmosphere.

Those modifications and equivalents which fall within the spirit of the invention are to be considered a part thereof.

What is claimed is:

1. Apparatus for conditioning a gaseous sample which is to be analyzed, which comprises a heated cabinet, means for introducing a gaseous sample into said cabinet, by-pass means within said cabinet for diverting a portion of said gaseous sample and exhausting it from said cabinet without analysis, sample conveying means within said cabinet for conveying a predetermined portion of said gaseous sample to analyzing means, means for achieving atmospheric equalization of the pressure within said sample conveying means, and means for purging with air said sample introducing means, said by-pass means and said sample conveying means.

2. Apparatus as set forth in claim 1 having separate means for introducing a calibrating gas into said cabinet and to said sample conveying means.

3. Apparatus as set forth in claim 1 having means within said heated cabinet for separating liquids present in said gaseous sample.

4. Apparatus as set forth in claim 1 having a Venturi section associated with said by-pass means within said cabinet which serves as a driving force for directing and exhausting a portion of said gaseous sample from said cabinet and for conveying another portion of said sample to analyzing means.

5. Apparatus as set forth in claim 1 having a heater within said cabinet for heating the purging air.

6. Apparatus as set forth in claim 1 having two separate means for introducing two calibrating gases into said cabinet and to said sample conveying means.

* * * * *